(12) United States Patent
Lenz et al.

(10) Patent No.: US 6,616,750 B2
(45) Date of Patent: Sep. 9, 2003

(54) TERNARY PIGMENT COMPOSITIONS

(75) Inventors: Roman Lenz, Liestal (CH); Olof Wallquist, Therwil (CH); Ingo Schlöder, Matran (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/242,144

(22) Filed: Sep. 12, 2002

(65) Prior Publication Data

US 2003/0089280 A1 May 15, 2003

Related U.S. Application Data

(63) Continuation of application No. 09/755,368, filed on Jan. 5, 2001, now abandoned.

(30) Foreign Application Priority Data

Jan. 27, 2000 (CH) ................................. 155/00

(51) Int. Cl.[7] ............................................. C08K 5/3415
(52) U.S. Cl. ........................................ 106/498; 106/494
(58) Field of Search ................................ 106/494, 498

(56) References Cited

U.S. PATENT DOCUMENTS

| | | | |
|---|---|---|---|
| 4,415,685 A | 11/1983 | Iqbal et al. ............... | 524/92 |
| 4,579,949 A | 4/1986 | Rochat et al. ............ | 546/167 |
| 4,720,305 A * | 1/1988 | Iqbal et al. ............... | 106/494 |
| 4,783,540 A | 11/1988 | Babler ...................... | 548/453 |
| 4,791,204 A | 12/1988 | Jost et al. .................. | 548/101 |
| 4,808,230 A | 2/1989 | Bugnon et al. ............ | 106/483 |
| 4,880,472 A | 11/1989 | Bugnon et al. ............ | 106/493 |
| 4,889,562 A | 12/1989 | Bugnon et al. ............ | 106/204 |
| 5,145,524 A | 9/1992 | Ganci ....................... | 106/493 |
| 5,200,528 A | 4/1993 | Wooden et al. ........... | 548/453 |
| 5,271,759 A | 12/1993 | Wooden et al. ........... | 106/411 |
| 5,334,727 A | 8/1994 | Campbell ................. | 548/373 |
| 5,342,955 A | 8/1994 | Wooden et al. ........... | 548/255 |
| 5,424,452 A | 6/1995 | Wooden et al. ........... | 548/453 |
| 5,482,547 A | 1/1996 | Bugnon et al. ............ | 106/493 |
| 5,522,925 A | 6/1996 | Chassot et al. ........... | 106/498 |
| 5,641,350 A | 6/1997 | Chassot et al. ........... | 106/493 |
| 5,679,148 A | 10/1997 | Bugnon ..................... | 106/494 |
| 5,685,901 A | 11/1997 | Bugnon ..................... | 106/494 |
| 5,708,188 A | 1/1998 | Hao et al. .................. | 548/453 |
| 5,785,750 A | 7/1998 | Hendi ........................ | 106/497 |
| 5,786,487 A | 7/1998 | Hendi ........................ | 548/453 |
| 5,827,364 A | 10/1998 | Hendi ........................ | 106/495 |
| 6,036,766 A * | 3/2000 | Hendi et al. ............... | 106/494 |
| 6,066,202 A * | 5/2000 | Wallquist et al. .......... | 106/494 |
| 6,248,165 B1 * | 6/2001 | Hendi et al. ............... | 106/494 |

FOREIGN PATENT DOCUMENTS

| | | | |
|---|---|---|---|
| GB | 2238550 | | 6/1991 |
| GB | 2 238 550 | * | 6/1991 |

\* cited by examiner

Primary Examiner—Anthony J. Green
(74) Attorney, Agent, or Firm—David R. Crichton

(57) ABSTRACT

Ternary pigment compositions of compounds of formulae (I), (II) and (III)

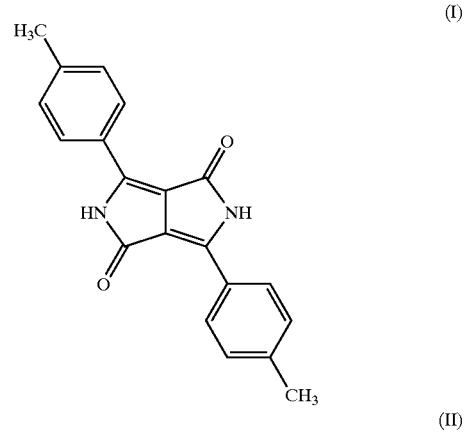

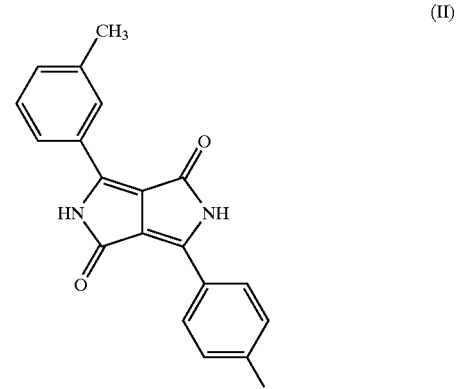

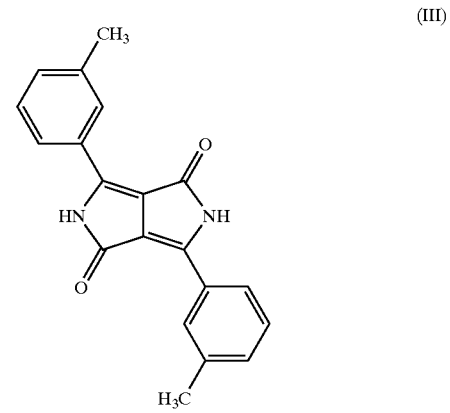

obtainable by reaction of succinic acid diesters with from 90 to 15 mol % 4-methylbenzonitrile and from 10 to 85 mol % 3-methylbenzonitrile, the molar amounts of the benzonitriles totalling 100 mol %, a process for the preparation thereof, and the use thereof for pigmenting organic material.

3 Claims, No Drawings

TERNARY PIGMENT COMPOSITIONS

This application is a continuation of application Ser. No. 09/755,368 filed Jun. 5, 2001, abandoned.

The present invention relates to ternary pigment compositions comprising compounds of formulae (I), (II) and (III)

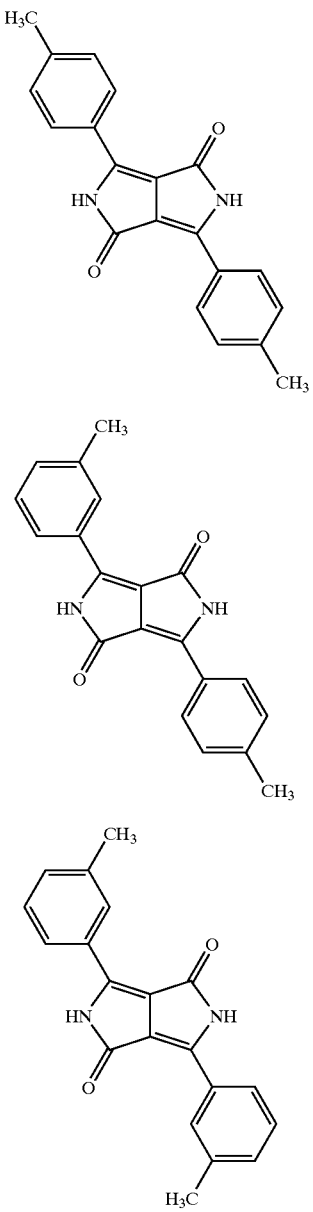

obtainable by the reaction of succinic acid diesters with a mixture of from 90 to 15 mol %, preferably from 80 to 25 mol %, more preferably from 75 to 25 mol %, 4-methylbenzonitrile and from 10 to 85 mol %, preferably from 20 to 75 mol %, more preferably from 25 to 75 mol %, 3-methylbenzonitrile, the molar amounts of the 4-methyl- and 3-methylbenzonitriles totalling 100 mol %, and to a process for the preparation thereof and to the use thereof for pigmenting organic material.

There are known from U.S. Pat. No. 4,720,305 pigment compositions of diketopyrrolopyrroles (DPPs) that can be prepared by mixed synthesis of two different nitrites A and B with succinic acid diester, the molar amounts of the nitrites disclosed in the Examples lying in the range from 90 to 99.9 mol % A relative to from 10 to 0.1 mol % B. 3- and 4-methylbenzonitriles are not specifically described.

There are known from U.S. Pat. No. 4,579,949 (examples 30, 36 and 37) processes for the preparation of pigment compositions of diketopyrrolopyrroles by the reaction of a succinic acid diester with a mixture of 4-methylbenzonitrile with benzonitrile, 4-methoxybenzonitrile or 4-chlorobenzonitrile in a molar ratio of 1:1. The preparation of DPP (I), a red pigment, is described in example 4 of that patent.

There is known from U.S. Pat. No. 4,783,540 (example 2) a red pigment composition of DPP (I) and DPP (III) in a molar ratio of 83:17, which is prepared in a two-step process by the preparation of the individual pigments (I) and (III) and subsequent co-precipitation thereof.

There is known from U.S. Pat. No. 5,708,188, example 2, a red pigment composition of DPP (III) and 1,4-diketo-3,6-di(4-chlorophenyl)pyrrolo[3,4-c]pyrrole in a molar ratio of 1:1.

In U.S. Pat. No. 4,415,685, the DPPs of formulae (I) and (III) (examples 28 and 31) are described as individual pigments having a red shade.

The problem underlying the present invention was to provide pigment compositions, preferably having high saturation and high hiding power, preferably colourants for industrial paint, that are distinguished by their yellowish-red to orange shade and that are obtainable by a simple and economically attractive preparation procedure. The finished colouration (in pressed PVC sheets containing 0.5% by weight pigment, see definition hereinbelow) of the pigment compositions should especially have a colour shade angle h in the range from 35 to 45, without the other desirable pigment characteristics being adversely affected.

The pigment compositions defined at the outset were accordingly discovered.

Also discovered were the use of such compositions for pigmenting high molecular weight material, especially for industrial paints, and a process for the preparation thereof.

A preferred embodiment of the present invention relates to those pigment compositions according to the invention that have a hiding power $\Delta E^*$–S/W of <8, preferably <7 and more preferably <5, and most preferably of <3. The analytical samples (pressed PVC plates (1 mm thick), containing 0.5% by weight of a pigment composition according to the invention) for measurement of the $\Delta E^*$–S/W values are prepared according to DIN 53 775 part 7. The $\Delta E^*$–S/W value indicates the amount of colour difference of the analytical samples in the L*C*h system of the Commission Internationale de IEclairage, over black ("S") and white backgrounds; the smaller the value, the more opaque/the better the hiding power of the analytical sample.

In a preferred embodiment of the present invention, the pigment compositions according to the invention are obtainable by using the 4-methyl- and 3-methylbenzonitriles in a molar ratio of from 80 to 55 mol % 4-methylbenzonitrile to from 20 to 45 mol % 3-methylbenzonitrile, the pigment compositions so obtainable having a colour shade angle h in the range from 35 to 42, preferably in the range from 36 to 39 and more preferably in the range from 37 to 38.5.

The colour shade angle h is defined in the L*C*h system of the Commission Internationale de IEclairage, L* being a measure of the brightness and C* a measure of the saturation. The h and C* values used in the present invention are determined in accordance with the measuring method DIN 53 775 part 7 using 0.5% by weight pigment in pressed PVC sheets.

A further more preferred embodiment of the pigment compositions according to the invention is obtainable by using the 4-methyl- and 3-methyl-benzonitriles in a molar ratio of from 80 to 55 mol % 4-methylbenzonitrile to from 20 to 45 mol % 3-methylbenzonitrile, the pigment compositions having a colour shade angle h in the range from 35 to 42, and a saturation value C* in the range from 65 to 80.

In a further preferred embodiment, pigment compositions according to the invention are furthermore obtainable by using the 4-methyl- and 3-methyl-benzonitriles in a molar ratio of from 45 to 25 mol % 4-methylbenzonitrile to from 55 to 75 mol % 3-methylbenzonitrile, the pigment compositions having a colour shade angle h in the range from 35 to 45, preferably in the range from 36 to 43 and more preferably in the range from 38 to 43.

A further preferred embodiment of the present invention relates to pigment compositions according to the invention that are obtainable by using the 4-methyl- and 3-methyl-benzonitriles in a molar ratio of from 80 to 55 mol % 4-methylbenzonitrile to from 20 to 45 mol % 3-methylbenzonitrile, the crystal lattice of which compositions substantially corresponds to that of compound (I) and preferably has twice the glancing angle (2 theta) at 7.4; 15.5; 20.1; 22.2; 22.9; 24.3; 26; 7; 31.2 and 32.6 (+/−0.5 theta) in the X-ray spectrum.

A further preferred embodiment of the present invention relates to pigment compositions according to the invention that are obtainable by using 4-methyl- and 3-methyl-benzonitrile in a molar ratio of from 45 to 25 mol %, preferably from 40 to 25 mol %, 4-methylbenzonitrile, to from 55 to 75 mol %, preferably from 60 to 75 mol %, 3-methylbenzonitrile, the crystal lattice of which compositions substantially corresponds to that of compound (II) and preferably has twice the glancing angle (2 theta) at 7.8; 12.5; 14.0; 15.5; 19.1; 21.1; 23.7; 26.1 and 32.3 (+/−0.5 2 theta) in the X-ray spectrum.

An more preferred embodiment of the present invention relates to the pigment compositions according to the invention that have a colour shade angle h in the range from 35 to 45, preferably in the range from 36 to 43, and of which the crystal lattice substantially corresponds to that of compound (II), the X-ray spectrum preferably having twice the glancing angle (2 theta) at 7.8; 12.5; 14.0; 15.5; 19.1; 21.1; 23.7; 26.1 and 32.3 (+/−0.5 2 theta), which compositions are obtainable by using 4-methyl- and 3-methyl-benzonitrile in a molar ratio of from 40 to 25 mol % 4-methylbenzonitrile to from 60 to 75 mol % 3-methyl-benzonitrile.

Most preferred are pigment compositions that have a colour shade angle h in the range from 38 to 43 and of which the crystal lattice substantially corresponds to that of compound (II), the X-ray spectrum preferably having twice the glancing angle (2 theta) at 7.8; 12.5; 14.0; 15.5; 19.1; 21.1; 23.7; 26.1 and 32.3 (+/−0.5 2 theta), which compositions are obtainable by using 70 mol % 4-methylbenzonitrile relative to 30 mol % 3-methylbenzonitrile. The term "substantially" indicates that the X-ray spectrum of the pigment compositions according to the invention corresponds to the X-ray spectrum of the individual compound (I), (II) or (III) as the case may be (depending on the composition), except that characteristic glancing angle shifts of the individual reflections may be possible as a result of lattice expansion (shift toward smaller glancing angles) or lattice contraction (shift toward larger glancing angles) in the region of +/−0.5 theta, or as a result of variations in intensity.

According to observations hitherto, depending on the composition the compounds (I) or (II) form a host lattice in which each of the other two components are incorporated.

The X-ray spectrum of a solid solution is fundamentally different from that of a pure physical mixture of the same substances. In the latter, the X-ray spectrum substantially coincides with the superposed X-ray spectra of the pure substances whereas, in the case of a solid solution, a different spectrum is obtained. In the special case of a solid solution of the "host-guest" type, the spectrum substantially corresponds to that of the host lattice.

The X-ray spectrum of compound (I) is characterised by twice the glancing angle (2 theta) at 7.4; 12.6; 15.5; 20.1; 22.2; 22.9; 24.3; 26.7; 31.2; 32.6 and 41.4.

The X-ray spectrum of compound (II) is characterised by twice the glancing angle (2 theta) at 7.8; 12.5; 14.0; 15.5; 19.1; 21.1; 23.7; 26.1; 28.3; 32.3 and 41.9.

The preparation of the pigment compositions according to the invention is generally carried out analogously to the procedure described in U.S. Pat. No. 4,720,305 by reacting a mixture consisting of 3-methyl- and 4-methyl-benzonitrile with a succinic acid diester.

The present invention accordingly relates to a process for the preparation of the pigment compositions according to the invention by the reaction of succinic acid diesters with a mixture of benzonitriles in an organic solvent, in the presence of a base, at elevated temperature, which process comprises using as nitriles a mixture of 4-methyl- and 3-methylbenzonitrile, the 4-methyl- and 3-methyl-benzonitriles being used in a molar ratio of from 90 to 15 mol % 4-methylbenzonitrile to from 10 to 85 mol % of 3-methylbenzonitrile.

The total concentration of the nitrites in the organic solvent is generally in the range from 5 mol/l to 0.5 mol/l.

The molar ratio of base to succinic acid diester is generally in the range from 0.1 to 10 mol base to 1 mol succinic acid diester.

The pressure chosen is preferably atmospheric pressure.

The reaction temperature is usually in the range from 60 to 140° C., preferably in the range from 80 to 120° C.

The duration of the reaction is usually selected according to the temperature chosen. It is generally in the range from 30 minutes to 20 hours.

Using conventional methods (as described, for example, in U.S. Pat. No. 4,783,540 and U.S. Pat. No. 4,579,949), the reaction product can be worked up by hydrolysis and/or protolysis and subsequently isolated.

If desired, it is advisable for the process according to the invention to be carried out in the presence of growth inhibitors.

The present invention furthermore relates to compositions comprising the pigment compositions according to the invention.

A preferred embodiment of the present invention relates to compositions comprising the pigment compositions according to the invention and growth inhibitors.

A preferred embodiment of the process according to the invention relates to a process for the preparation of the pigment compositions according to the invention comprising growth inhibitors by the reaction of succinic acid diesters with a mixture of benzonitriles in an organic solvent, in the presence of a base, at elevated temperature, which process comprises using the benzonitriles in a molar ratio of from 90 to 15 mol % 4-methylbenzonitrile to from 10 to 85 mol % 3-methylbenzonitrile and carrying out the reaction in the presence of a growth inhibitor.

A further preferred embodiment of the present invention relates to compositions obtainable in accordance with the process of the invention that comprise the pigment compositions and growth inhibitors.

Suitable growth inhibitors include substituted benzonitriles, for example isophthalodinitrile and terephthalodinitrile, and substituted DPPs, for example 1,4-diketo-3,6-di(3-cyano-phenyl)pyrrolo[3,4-c]pyrrole, isophthalodinitrile being more preferred.

The molar ratio of the growth inhibitors to the mixture of the methylbenzonitriles is generally in the range from 0.0001 to 1 mol, preferably from 0.001 to 0.1 mol, growth inhibitor to 1 mol of the mixture of the methylbenzonitriles.

Organic solvents may be, for example, polar, non-polar, protic or aprotic organic solvents. Specific examples of solvents that may be mentioned are ethers, such as tetrahydrofuran, dioxane or glycol ethers, such as ethylene glycol methyl ether, ethylene glycol ethyl ether, diethylene glycol monomethyl ether or diethylene glycol monoethyl ether, or aromatic hydrocarbons, such as benzene, or benzene substituted by alkyl, alkoxy or by halogen, such as toluene, xylene, anisole or chlorobenzene, dichloro- or trichloro-benzene, N,N'-dimethylacetamide, N-methylpyrrolidone, or aromatic N-heterocycles, such as pyridine, picoline or quinoline, or alcohols, such as secondary and tertiary alcohols, e.g. tert-butanol, sec-amyl alcohol or tert-amyl alcohol, and also ethylene glycol or propylene glycol. The mentioned solvents may also be used in the form of mixtures.

There may be used as bases, for example, alkali metals, such as lithium, sodium or potassium, and also the hydroxides thereof, such as lithium, sodium or potassium hydroxide, or alkali metal amides thereof, such as lithium, sodium or potassium amide, or alkali metal hydrides thereof, such as lithium, sodium or potassium hydride, or alkali metal alcoholates thereof, especially alcohols of $C_4$–$C_{10}$alkanes, e.g. calcium, magnesium, lithium, sodium or potassium tert-butanolate, potassium tert-amylate, potassium 2-methyl-2-pentanolate, potassium 3-methyl-3-pentanolate, potassium 3-ethyl-3-pentanolate.

Succinic acid diesters are symmetric or asymmetric diesters, preferably symmetric diesters. Preference is given to the use of succinic acid dialkyl esters, such as succinic acid di($C_1$–$C_{12}$alkyl)esters, especially succinic acid di($C_1$–$C_8$alkyl)esters and more especially succinic acid di($C_1$–$C_5$alkyl)esters, and also succinic acid diaryl- and succinic acid monoaryl-monoalkyl esters, in which aryl may be unsubstituted or substituted, for example, by one or two halogen atoms, $C_1$–$C_6$alkyl or $C_1$–$C_6$alkoxy. Preferably, aryl is phenyl. Special preference is given to succinic acid diesters, such as succinic acid dimethyl ester, diethyl ester, dipropyl ester, dibutyl ester, dipentyl ester, diheptyl ester, dioctyl ester, di-isopropyl ester, diheptyl ester, di-sec-butyl ester, di-tert-butyl ester, di-tert-amyl ester, di[1,1-dimethylbutyl]ester, di[1,1,3,3-tetramethylbutyl]ester, di[1,1-dimethylpentyl]ester, di[1-methyl-1-butyl]ester, di[1,1-dimethylpentyl]ester, di[1-methyl-1-ethylbutyl]ester, di[1,1-diethylpropyl]ester, diphenyl ester, di[4-methylphenyl]ester, di[2-methylphenyl]ester, di[4-chlorophenyl]ester, di[2,4-chlorophenyl]ester or monoethyl monophenyl ester.

The succinic acid diesters listed above are known compounds and some are available commercially.

If desired, rheology-improving compounds may be added to the pigment compositions according to the invention.

A further preferred embodiment of the present invention accordingly relates to compositions comprising the pigment compositions according to the invention and rheology-improving compounds.

The amount of rheology-improving compounds used relative to the amount of pigment compositions is generally in the range from 0.1% by weight to 20% by weight, preferably from 0.5% by weight to 10% by weight.

Rheology-improving compounds are known and include, for example, diketopyrrolopyrrole derivatives or compositions comprising diketopyrrolopyrrole derivatives, especially diketopyrrolopyrrolesulfonic acid salts, as described, for example, in GB-2 238 550, U.S. Pat. No. 4,791,204, U.S. Pat. No. 4,914,211, GB 430 875, U.S Pat. No. 5,271,759, U.S. Pat. No. 5,785,750 or U.S. Pat. No. 5,786,487, amino-substituted diketopyrrolopyrroles, as known from U.S. Pat. No. 5,334,727, U.S. Pat. No. 5,200,528, U.S. Pat. No. 5,685,901, U.S. Pat. No. 5,342,955, U.S. Pat. No. 5,424,452 or U.S. Pat. No. 6,066,202, and silane-substituted diketopyrrolopyrroles, as known from U.S. Pat. No. 5,482,547. Rheology-improving compounds also include, for example, polymers, as known from U.S. Pat. No. 5,145,524, U.S. Pat. No. 5,685,901 or U.S. Pat. No. 5,679,148, chelate complexes, as described in U.S. Pat. No. 5,685,901, inorganic compounds used as coatings, as known, for example, from U.S. Pat. No. 4,880,472, U.S. Pat. No. 4,808,230, U.S. Pat. No. 4,889,562, U.S. Pat. No. 5,522,925 or U.S. Pat. No. 5,641,350, quinacridone derivatives, as known, for example, from U.S. Pat. No. 5,827,364, and perylene additives, as described in EP 1 029 899.

The rheology-improving compound can usually be added during or after the preparation of the pigment compositions.

A further preferred embodiment of the process according to the invention accordingly relates to a process for the preparation of compositions comprising the pigment compositions according to the invention and rheology-improving compounds by the reaction of succinic acid diesters with different benzonitriles in an organic solvent, in the presence of a base, at elevated temperature, which process comprises using the benzonitriles in a molar ratio of from 90 to 15 mol % 4-methylbenzonitrile to from 10 to 85 mol % 3-methylbenzonitrile and carrying out the reaction in the presence of rheology-improving compounds.

Generally, the pigment compositions are combined with the rheology-improving compounds using conventional blending methods.

A further preferred embodiment of the present invention relates to compositions obtainable by the process according to the invention that comprise the pigment compositions with rheology-improving compounds.

If desired, texture improvers may be added to the pigment compositions according to the invention.

Suitable texture improvers include, for example, fatty acids having at least 12 carbon atoms, such as, especially, stearic or behenic acid, stearic or behenic acid amide, salts of stearic or behenic acid, such as magnesium, zinc or aluminium stearate or behenate, also quaternary ammonium compounds, such as, especially, tri($C_1$–$C_4$) alkylbenzylammonium salts, e.g. trimethyl-, triethyl-, tri-n-propyl-, tri-isopropyl-, tri-n-butyl-, tri-sec-butyl- and tri-tert-butyl-benzylammonium salts, and also plasticisers, such as epoxidised soybean oil, waxes, such as polyethylene wax, resin acids, such as abietic acid, colophony soap, hydrogenated or dimerised colophony, ($C_{12}$–$C_{18}$)paraffindisulfonic acid, alkylphenols and alcohols, such as stearyl alcohol. Also suitable are laurylamine and stearylamine, as well as aliphatic 1,2-diols, such as 1,2-dodecanediol.

Preferred texture improvers are laurylamine and stearylamine, aliphatic 1,2-diols, stearic acid and amides, salts and esters thereof, epoxidised soybean oil, waxes and resin acids.

Such additives may be added, before, during or after the preparation of the composition, in amounts of from 0.05 to 20% by weight, preferably from 1 to 10% by weight, based on the composition according to the invention.

The pigment compositions according to the invention may be used for pigmenting organic material, especially low molecular weight or high molecular weight organic material.

One embodiment of the invention relates to the use of a pigment composition according to the invention for pigmenting organic material.

A further embodiment of the invention relates to a method of pigmenting organic material by blending organic material with a Unctorially effective amount of the pigment compositions according to the invention. If desired, the products obtained by the synthesis can be converted into a disperse form. This can be effected in a manner known per se. Depending on the compound and the intended use, it has proved advantageous to use the colourants as toners or in the form of preparations.

Low molecular weight organic material may be, for example, mineral oil, lubricating grease or wax.

High molecular weight material having a molecular weight (Mw) of from $10^4$ to $10^8$ g/mol may be, for example, synthetic and/or natural substances, for example natural resins or dry oils, rubber or casein, or modified natural substances, such as chlorinated rubber, oil-modified alkyd resins, viscose, or cellulose ethers or esters, such as ethylcellulose, cellulose acetate, propionate or butyrate, cellulose acetobutyrate and nitrocellulose, but are especially completely synthetic organic polymers (thermosetting plastics and thermoplastics), as can be obtained by polymerisation, for example by polycondensation or polyaddition. The class of the polymers includes, for example, polyolefins, such as polyethylene, polypropylene, polyisobutylene, also substituted polyolefins, such as polymerisation products of monomers, such as vinyl chloride, vinyl acetate, styrene, acrylonitrile, acrylic acid esters, methacrylic acid esters, fluoropolymerisation products, such as polyfluoroethylene or polytrifluorochloroethylene or a tetrafluoroethylene/hexafluoropropylene mixed polymerisation product, and also copolymerisation products of the said monomers. From the series of the polyaddition and polycondensation resins there may be used, for example, condensation products of formaldehyde with phenols, so-called phenoplasts, and condensation products of formaldehyde and urea or thiourea; also melamine, so-called aminoplasts; also the polyesters used as surface-coating resins, either saturated, such as alkyd resins, or unsaturated, such as maleic resins; also linear polyesters, polycarbonates, polyphenylene oxides or silicones, and silicone resins. The high molecular weight organic material may also be a partially crystalline or amorphous plastics, such as LLDPE (linear low-density polyethylene). "Partially crystalline plastics" are to be understood as meaning plastics that on solidification form small crystalline nuclei or aggregates (for example spherulites or quadrites), including such materials that do this only in the presence of nucleating agents (for example organic pigments).

Plastics may be thermoplastic high molecular weight organic materials having a molecular weight ($M_w$) of from $10^4$ to $10^8$ g/mol, preferably from $10^5$ to $10^7$ g/mol. Where the plastics are partially crystalline, they usually have a degree of crystallinity ($X_c$) of from 10 to 99.9%, especially from 40 to 99%, more especially from 80 to 99%. Preferred partially crystalline plastics are homopolymers, block or random copolymers and terpolymers of ethylene, propylene, butylene, styrene and/or divinylbenzene, especially α-olefins, such as HDPE (high-density polyethylene), LDPE (low-density polyethylene), polypropylene and polystyrene, as well as polyesters, such as polyethylene terephthalate (PET) and thermoplastic ionomers. Especially preferred partially crystalline plastics are polyolefins, especially polyethylene of high-density and polypropylene. The partially crystalline plastics may also optionally comprise customary amounts of additives, for example stabilisers, fluorescent whitening agents, fillers and/or lubricants.

The said high molecular weight compounds may be present individually or in mixtures as plastic masses, melts or in the form of spinning solutions. They may also be in the form of their monomers or in the polymerised state in dissolved form as film formers or binders for surface-coating compositions or for printing inks, e.g. linseed oil varnish, nitrocellulose, alkyd resins, melamine resins and urea-formaldehyde resins or acrylic resins.

The present invention accordingly relates furthermore to the use of the pigment compositions according to the invention in the preparation of inks, for printing inks in printing processes, for flexographic printing, screen printing, the printing of packaging, security colour printing, intaglio printing or offset printing, for preliminary stages of printing and for printing textiles, for office or home use or for graphics applications, for example for paper goods, for ballpoint pens, felt-tip pens, fibre-tip pens, cardboard, wood, (wood)stains, metal, stamp pads or inks for impact-printing processes (using impact printing ink ribbons), in the preparation of surface-coating compositions, for industrial or commercial use, for textile decoration and industrial labelling, for roller coatings or powder coatings or for automotive lacquers, for high-solids (low-solvent), aqueous or metallic surface-coating compositions or for pigmented formulations for aqueous paints, for mineral oils, lubricating greases or waxes, in the preparation of coloured plastics for coatings, fibres, plates or moulded substrates, in the preparation of non-impact-printing material for digital printing, for thermal wax transfer printing, ink-jet printing or for thermal transfer printing, and also in the preparation of polymeric colour particles, toners, dry copy toners, liquid copy toners or electrophotographic toners.

The present invention relates furthermore to inks comprising high molecular weight organic material and a tinctorially effective amount of the composition according to the invention.

Processes for the preparation of inks, especially for ink-jet printing, are generally known and are described, for example, in U.S. Pat. No. 5,106,412.

The inks can be produced, for example, by blending the pigment compositions according to the invention with polymeric dispersants.

Blending of the pigment compositions according to the invention with the polymeric dispersant is preferably carried out according to generally known methods of blending, such as stirring or mixing, the use of an intensive mixer (e.g. of the trademark Ultra-Turrax®) being especially recommended.

When blending the pigment compositions according to the invention with polymeric dispersants, an organic solvent is advantageously used, especially a water-miscible organic polar, protic or aprotic solvent, e.g. an alcohol or ketone.

The ratio by weight of the pigment compositions according to the invention relative to the ink is advantageously in the range from 0.0001 to 75% by weight, especially from 0.001 to 50% by weight, based on the total weight of the ink.

The present invention accordingly relates also to a process for the preparation of inks which comprises blending with one another high molecular weight organic material and a tinctorially effective amount of the pigment compositions according to the invention.

The present invention relates also to a colourant comprising high molecular weight organic material and a composition according to the invention in a tinctorially effective amount.

The present invention relates in addition to a process for the preparation of colourants which comprises blending a high molecular weight organic material and a tinctorially effective amount of the composition according to the invention.

The present invention relates furthermore to coloured plastics or polymeric colour particles comprising high molecular weight organic material and the composition according to the invention in a tinctorially effective amount.

The present invention relates in addition to a process for the preparation of coloured plastics or polymeric colour particles, which comprises blending with one another a high molecular weight organic material and a tinctorially effective amount of the composition according to the invention.

The colouring of high molecular weight, organic substances using the pigment compositions according to the invention is effected, for example, by admixing such a colourant, optionally in the form of a masterbatch, with such substrates using roll mills or mixing or grinding apparatuses, with the result that the colourant is dissolved or finely distributed in the high molecular weight material. The high molecular weight organic material with the admixed colourant is then processed according to methods known per se, such as, for example, calendering, compression moulding, extrusion, coating, spinning, pouring or injection moulding, whereby the coloured material acquires its final shape. Admixture of the colourant can also be effected immediately prior to the actual processing step, for example by continuously feeding a pulverulent colourant according to the invention and a granulated high-molecular weight organic material and, optionally, also additional ingredients, such as additives, directly into the intake zone of an extruder, the constituents being mixed-in just before being processed. Generally, however, preference is given to mixing the colourant into the high molecular weight organic material beforehand, since more uniform results can be achieved. In order to produce non-rigid mouldings or to reduce their brittleness, it is frequently desirable to incorporate so-called plasticisers into the high molecular weight compounds prior to shaping. There may be used as plasticisers, for example, esters of phosphoric acid, phthalic acid or sebacic acid. In the process according to the invention, the plasticisers can be incorporated into the polymers before or after the incorporation of the colourant. It is also possible, in order to achieve different colour shades, to add to the high molecular weight organic materials, in addition to the pigment compositions according to the invention, constituents such as white, coloured or black pigments, in any desired amounts.

For the colouring of surface-coating compositions and printing inks, the high molecular weight organic materials and the pigment compositions according to the invention are finely dispersed or dissolved, optionally together with additives, such as fillers, dyes, pigments, siccatives (drying agents) or plasticisers, in a common organic solvent or solvent mixture. It is also possible to use a procedure in which the individual components are dispersed or dissolved separately or in which a plurality thereof are dispersed or dissolved together, and only then all of the components combined. The processing is effected according to customary methods, for example by spraying, film-coating or one of the many printing methods, the surface-coating composition or the printing ink advantageously being cured thermally or by irradiation, where appropriate after drying beforehand.

When the high molecular weight material to be coloured is a surface-coating composition, it may be a usual surface-coating composition, or a specialist surface-coating composition, for example an automotive lacquer.

Preference is given to the colouring of thermoplastic plastics, especially in the form of fibres, as well as printing inks. Preferred high molecular weight organic materials that can be coloured in accordance with the invention are generally polymers having a dielectric constant $\geq 2.5$, especially polyesters, polycarbonate (PC), polystyrene (PS), polymethyl methacrylate (PMMA), polyamide, polyethylene, polypropylene, styrenelacrylonitrile (SAN) and acrylonitrile/butadiene/styrene (ABS). Especially preferred are polyesters, poly- carbonate, polystyrene and PMMA. More especially preferred are polyesters, polycarbonate and PMMA, especially aromatic polyesters, which can be obtained by polycondensation of terephthalic acid, for example polyethylene terephthalate (PET) or polybutylene tere- phthalate (PBTP).

Special preference is given also to the colouring of low molecular weight organic material, such as mineral oils, lubricating greases and waxes, using the compositions according to the invention.

The present invention relates furthermore to non-impact-printing material that comprises high molecular weight organic material and a composition according to the invention in a tinctorially effective amount.

The present invention relates in addition to a process for the preparation of non-impact-printing material which comprises blending with one another a high molecular weight organic material and a tinctorially effective amount of a composition according to the invention.

The present invention relates also to a toner that comprises high molecular weight organic material and a pigment composition according to the invention in tinctorially effective amount.

The present invention relates furthermore to a process for the preparation of toners which comprises blending with one another a high molecular weight organic material and a tinctorially effective amount of the pigment compositions according to the invention.

In an especially preferred embodiment of the process according to the invention, toners, surface-coating compositions, inks or coloured plastics are prepared by processing masterbatches of toners, surface-coating compositions, inks or coloured plastics in roll mills or mixing or grinding apparatuses.

In the present invention, "a tinctorially effective amount" of the composition according to the invention generally denotes an amount of from 0.0001 to 99.99% by weight, especially from 0.001 to 50% by weight and more especially from 0.01 to 50% by weight, based on the total weight of the material pigmented or coloured therewith.

The invention relates also to a process for the preparation of coloured plastics, especially for the preparation of plastics coloured in the mass, which comprises mixing the pigment compositions according to the invention with the plastics material.

Usually, the composition according to the invention can be mixed and/or extruded with plastics granules or with a plastics powder. If desired, the mixture can be processed in the extruder to produce fibres, sheets or granules, which can then be shaped into articles, for example using the injection-moulding method.

A further embodiment of the present invention accordingly relates to a process for the preparation of plastics, especially partially crystalline plastics, coloured in the mass, which comprises moulding the pigment compositions according to the invention together with the plastics using the injection-moulding method.

The constituents of the injection-moulding formulation may be premixed before being fed into the injection-moulding machine, or they may alternatively be fed in individually at the same time. It is also possible to premix two or more components, and if desired also additives, and then feed in the mixture together with other individual or likewise-premixed components.

In a special embodiment of the process according to the invention the process is carried out in masterbatches.

The concentration of the composition according to the invention in the masterbatch is preferably from 5 to 70% by weight, based on the total weight of the composition according to the invention and the plastics material.

In the present invention, it has been possible to retain the good characteristics of the compounds (I), (II) and (III) in terms of application, and to broaden the field of use thereof in terms of application technology on account of the more-yellowish shade of red.

In particular, it has been found that the ternary DPP pigment compositions according to the invention are distinguished, for example in thermoplastics or thermosetting plastics, fibres, surface-coating compositions or printing inks, by a pure colour shade, high colour strength, high saturation and high opacity, good fastness to overspraying, fastness to migration, fastness to rubbing, fastness to light and fastness to weathering and by a good gloss. Especially advantageously, very opaque yellowish-red to orange colouration, having high hiding power, can be achieved using the pigment compositions according to the invention to colour high molecular weight or low molecular weight materials. Opaque colouration can be achieved using only small amounts of the pigment compositions according to the invention. The low use of colourant is economically advantageous. The pigment compositions according to the invention are suitable especially for industrial surface-coating compositions.

EXAMPLES

The analytical samples for measuring the colour shade angle h and the saturation C* and also the hiding power ΔE*–S/W are prepared according to DIN 53 775 part 7 using pressed PVC plates (1 mm thick) containing 0.5% by weight of the pigment composition in question from Examples 1 to 11.

The hiding power ΔE*–S/W is measured according to DIN 55984.

All colour measurements are effected using a Minolta CM-508i® spectrophotometer (d/8 geometry, including the gloss, illuminant D65, observer 10°).

The X-ray spectra are determined according to conventional methods using a Siemens D500® X-ray diffractometer (CuK$_\alpha$ radiation).

a) Measurement of the Colour Shade Angle h and the Saturation C of 1 mm Rolled PVC Sheets Premix:

Pigment, 0.4 g, is mixed for 30 minutes with a base mixture, 14 g, and then slowly stirred with 26 g of PVC, Vinnolit E® 70 g, (Vinnolit Kunststoff GmbH, D-85737-Ismaning).

| Base mixture | | Parts |
|---|---|---|
| DIDP (diisodecyl phthalate) Palatinol Z® | H. Haffner GmbH, D-71679 Asperg | 92.2 |

-continued

| Base mixture | | Parts |
|---|---|---|
| Rheoplast 39® | Ciba Spezialitäten Chemie | 4.2 |
| IRGASTAB BZ 561® | Ciba Spezialitäten Chemie | 3.6 |

Production of Rolled Sheets:

The mixture of PVC and pigment/base mixture obtained above is rolled in a 2-roll mill (Collin model, D-85560 Ebersberg) at a roll temperature of 165° C. (each roll) in accordance with the following three steps:

| a) hot-rolling roll nip | 8 min (rolled sheet turned every minute) 0.4 mm |
|---|---|
| b) rolling at elevated shearing forces | 20 passes at 75° C. |
| c) hot-rolling roll nip | 3 min 0.4 mm | b) Production of Pressed Plates:

Using a plate press (type 200 P, Collin model, D-85560 Ebersberg), the above-produced rolled sheet is treated for 5 minutes at a press temperature of 170° C. Pressed plates having a sheet thickness of 1 mm are obtained.

Example 1

A mixture of sodium, 9.2 g (0.4 mol) and tert-amyl alcohol, 160 ml, is stirred for 10 hours at from 105 to 115° C. 4-Methylbenzonitrile, 16.4 g (0.14 mol), and 3-methylbenzonitrile, 7.03 g (0.06 mol), are then added. The reaction mixture is then heated to from 105 to 110° C. and, with stirring, succinic acid diisopropyl ester, 26.9 g (0.13 mol), is fed in dropwise over a period of 5 hours. When the addition is complete, the resulting dark-red suspension is stirred for a further hour at 110° C. and then cooled to from 20 to 25° C. The reaction mixture is poured into a mixture of water, 200 ml, and methanol, 200 ml, and subsequently stirred at boiling temperature for 4 hours. The reaction mixture is then cooled to from 20 to 25° C. and filtered. The filtration residue is washed with a mixture of methanol and water. The washed filtration residue is dried in vacuo at 80° C. for approximately 12 hours, yielding 24.4 g (77.2% of theory) of a red powder, which in PVC produces an opaque, yellowish-red colouration.

| Elemental analysis | C | H | N |
|---|---|---|---|
| Calculated: | 75.93 | 5.10 | 8.85 |
| Found: | 75.41 | 5.18 | 8.74 |

The X-ray diffraction diagram is characterised by the following data:

| interplanar spacing (d in Å) | angle (2Θ) | relative intensity (%) |
|---|---|---|
| 29.14 | 3.03 | 6 |
| 11.39 | 7.75 | 100 |
| 7.06 | 12.52 | 6 |
| 5.69 | 15.55 | 26 |
| 4.48 | 19.82 | 11 |

-continued

| interplanar spacing (d in Å) | angle (2Θ) | relative intensity (%) |
|---|---|---|
| 4.05 | 21.92 | 13 |
| 3.81 | 23.35 | 12 |
| 3.64 | 24.46 | 7 |
| 3.34 | 26.64 | 82 |
| 2.86 | 31.22 | 10 |
| 2.74 | 32.64 | 8 |
| 2.17 | 41.65 | 4 |

The X-ray diffraction diagram of the host compound of formula I (prepared according to U.S. Pat. No. 4,415,685, example 28) is characterised by the following data:

| interplanar spacing (d in Å) | angle (2Θ) | relative intensity (%) |
|---|---|---|
| 11.89 | 7.43 | 100 |
| 7.02 | 12.59 | 5 |
| 5.70 | 15.53 | 30 |
| 4.41 | 20.14 | 10 |
| 4.01 | 22.15 | 11 |
| 3.88 | 22.88 | 11 |
| 3.66 | 24.32 | 8 |
| 3.33 | 26.71 | 76 |
| 2.86 | 31.21 | 11 |
| 2.75 | 32.58 | 8 |
| 2.18 | 41.38 | 4 |

Examples 2 to 9

The procedure for the preparation of the pigment compositions of examples 2 to 9 corresponds to that of example 1, the only difference being in the molar amounts of 4-methylbenzonitrile and 3-methylbenzonitrile used.

| | 4-methylbenzo-nitrile in mol | 3-methylbenzo-nitrile in mol | C* | h | ΔE*-S/W |
|---|---|---|---|---|---|
| Example 1 | 0.14 | 0.06 | 68.2 | 37.6 | 2.0 |
| Example 2 | 0.1 | 0.1 | 70.2 | 37.4 | 2.8 |
| Example 3 | 0.16 | 0.04 | 69.8 | 36.3 | 2.1 |
| Example 4 | 0.17 | 0.03 | 68.2 | 35.8 | 2.0 |
| Example 5 | 0.18 | 0.02 | 66.9 | 35.2 | 1.6 |
| Example 6 | 0.06 | 0.14 | 69.1 | 40.1 | 4.2 |
| Example 7 | 0.48 | 0.12 | 68.8 | 39.4 | 4.2 |
| Example 8 | 0.04 | 0.16 | 59.7 | 32.1 | 4.2 |
| Example 9 | 0.05 | 0.15 | 64.6 | 36.1 | 4.3 |

The X-ray diffraction diagram of the pigment composition of example 6 is characterised by the following data:

| interplanar spacing (d in Å) | angle (2Θ) | relative intensity (%) |
|---|---|---|
| 11.43 | 7.72 | 100 |
| 7.12 | 12.42 | 15 |
| 6.41 | 13.78 | 12 |
| 5.75 | 15.39 | 15 |
| 5.12 | 17.30 | 7 |
| 4.62 | 19.15 | 19 |
| 4.19 | 21.16 | 13 |
| 3.76 | 23.62 | 11 |
| 3.41 | 26.03 | 87 |

| interplanar spacing (d in Å) | angle (2Θ) | relative intensity (%) |
|---|---|---|
| 3.15 | 28.26 | 6 |
| 2.77 | 32.27 | 7 |
| 2.21 | 40.62 | 4 |
| 2.14 | 42.14 | 5 |

The X-ray diffraction diagram of the host compound of formula II (prepared according to U.S. Pat. No. 4,415,685, example 31) is characterised by the following data:

| interplanar spacing (d in Å) | angle (2β) | relative intensity (%) |
|---|---|---|
| 11.20 | 7.88 | 95 |
| 7.07 | 12.49 | 9 |
| 6.31 | 14.01 | 12 |
| 5.71 | 15.49 | 13 |
| 4.65 | 19.05 | 13 |
| 4.20 | 21.10 | 10 |
| 3.78 | 23.78 | 8 |
| 3.41 | 26.06 | 100 |
| 2.76 | 32.34 | 7 |

Example 10

A mixture of sodium, 69 g (3 mol), and tert-amyl alcohol, 591.3 ml, is stirred for 18 hours at from 105 to 115° C. 4-methylbenzonitrile, 52.7 9 (0.45 mol), and 3-methylbenzonitrile, 123 g (1.05 mol), and also isophthalodinitrile, 0.38 g (0.003 mol), and tert-amyl alcohol, 16.2 g, are then added. After the addition, the reaction mixture is heated to from 105 to 110° C. and, with stirring, succinic acid diisopropyl ester, 197.3 g (0.975 mol), is fed in dropwise over a period of 4 hours. When the addition is complete, the resulting dark-red suspension is stirred for a further 1.5 hours at 110° C. and then cooled to from 20 to 25° C. The reaction mixture is poured into a mixture of water, 500 ml, methanol, 800 ml, and tert-amyl alcohol, 200 g, and subsequently stirred at boiling temperature for 4 hours. The reaction mixture is then cooled to from 20 to 25° C. and filtered. The filtration residue is washed with a mixture of methanol, approximately 5 litres, and water, approximately 3 litres. The washed filtration residue is dried in vacuo at 80° C. for approximately 12 hours, yielding 152.8 g (64.4% of theory) of the pigment composition in the form of a red powder, which in PVC produces an opaque, yellowish-red colouration.

Example 11

A mixture of a diketopyrrolopyrrolesulfonate salt prepared according to example 1b of GB-2 238 550, 0.59 g, in water, 10 9, is added dropwise at 50° C. to a mixture of the pigment composition of example 10 (not dried, but in the form of an aqueous filter cake having a pigment content of 33.4%), 65 g (0.068 mol), and water, 390 g, and stirring is carried out for one hour. A mixture of calcium chloride, 0.10 g, dissolved in water, 10 g, is then added dropwise thereto. The resulting mixture is subsequently stirred for a further 2 hours at 25° C., filtered and then washed with water, and then dried for approximately 10 hours at 80° C. and 120 mbar, yielding 20.3 g of a composition comprising the pigment composition according to the invention.

We claim:

1. A process for the preparation of a pigment composition comprising reacting a succinic acid diester with 4-methylbenzonitrile and 3-methylbenzonitrile in an organic solvent, in the presence of a base, at a temperature range from 60 to 140° C., using the benzonitriles in a molar ratio of from 45 to 25 mol % 4-methylbenzonitrile to from 55 to 75 mol % 3-methylbenzonitrile.

2. A process according to claim 1, wherein the pigment composition is a ternary pigment composition comprising compounds of formulae (I), (II) and (III)

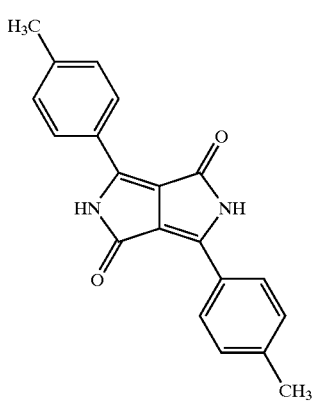

(I)

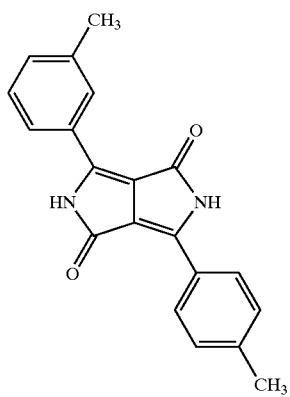

(II)

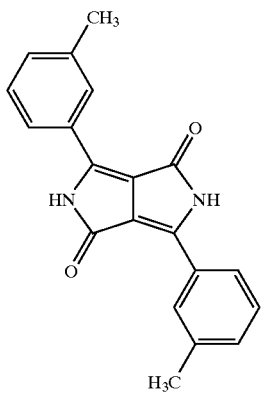

(III)

having a colour shade angle h in the range from 35 to 45 and a hiding power ΔE*–S/W of <8, the crystal lattice of which composition has twice the glancing angle (2 theta) at 7.8; 12.5; 14.0; 15.5; 19.1; 21.1; 23.7; 26.1 and 32.2 (+/−0.5 2 theta) in the X-ray spectrum.

3. A method of pigmenting organic material which comprises blending organic material with a tinctorially effective amount of a pigment composition prepared according to claim 1.

* * * * *